June 4, 1957   E. G. ROEHM   2,794,371
SPINDLE CONTROL FOR CONTOURING MACHINES
Filed Aug. 30, 1954   3 Sheets-Sheet 1

INVENTOR.
ERWIN G. ROEHM
BY H. K. Parsons &
L. W. Wright
ATTORNEYS

_United States Patent Office_ 2,794,371
Patented June 4, 1957

2,794,371

SPINDLE CONTROL FOR CONTOURING MACHINES

Erwin G. Roehm, Cincinnati, Ohio, assignor to The Cincinnati Milling Machine Co., Cincinnati, Ohio, a corporation of Ohio Application August 30, 1954, Serial No. 452,872

10 Claims. (Cl. 90—13)

This invention relates to improvements in contouring machines and has particular reference to an improved structure for controlling accurate angular adjustments of the cutter supporting portion of the machine.

One of the objects of the present invention is the provision of an improved cutter spindle carrier adjusting mechanism for contour milling machines for effecting accurate resultant positioning of the cutter spindle when working requirements are such that it must be variably tilted in more than one plane during performance of the contouring operation.

A further object of the present invention is the provision of an improved cutter spindle adjusting mechanism for contouring machines of a character which will simplify the design and construction of the controlling patterns for such angular adjustment by maintenance of a direct relationship between the variation in vertical height of the controlling pattern and the resultant angular shifting of the cutter spindle.

An additional object of the present invention is the provision of a simplification of mounting and control of an angularly adjustable spindle for a contouring machine which will facilitate imparting of pronounced tilting movements to the spindle.

Other objects and advantages of the present invention should be readily apparent by reference to the following specification, considered in conjunction with the accompanying drawings forming a part thereof, and it is to be understood that any modification may be made in the exact structural details there shown and described, within the scope of the appended claims, without departing from or exceeding the spirit of the invention.

Figure 1:
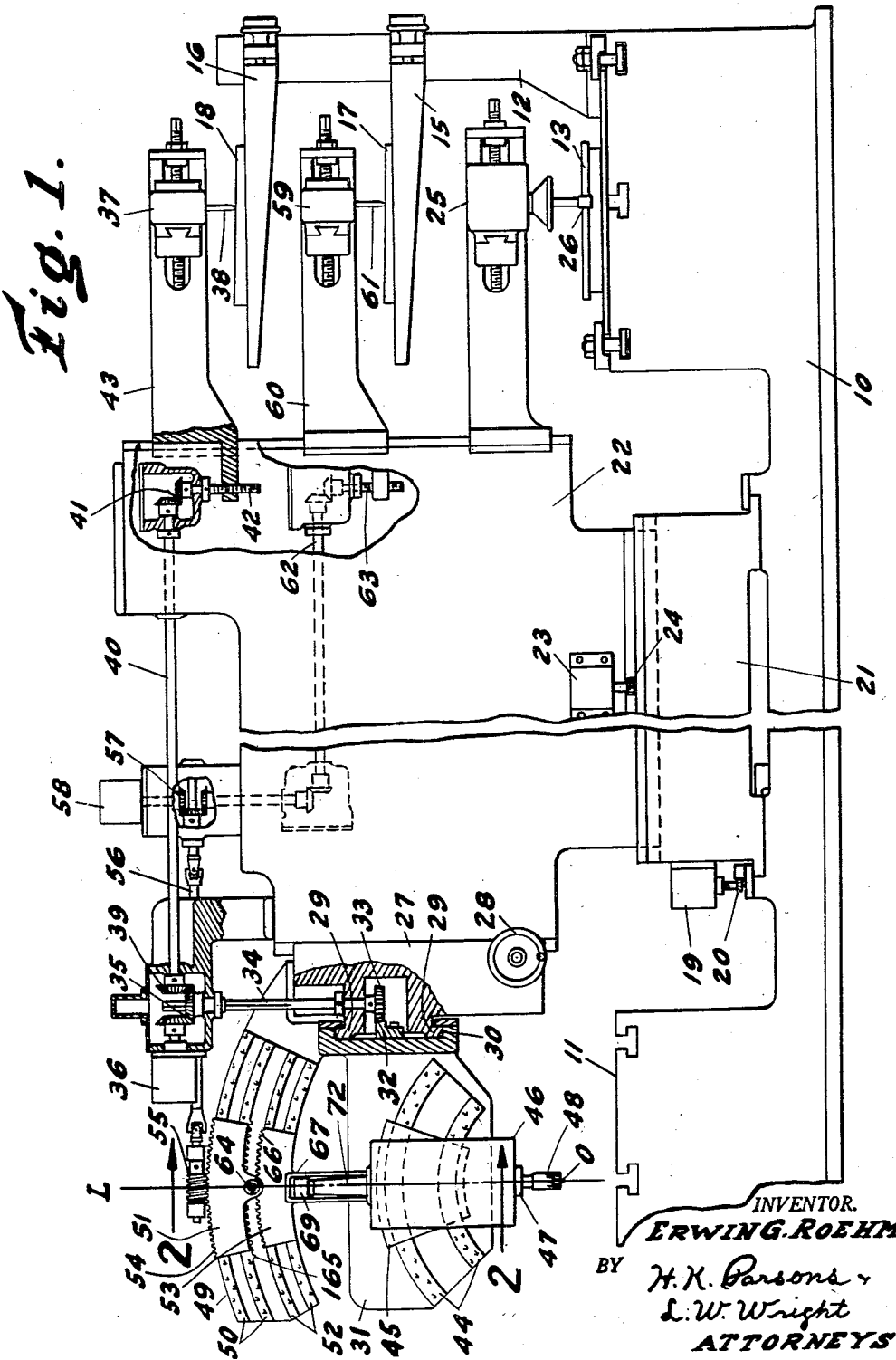
Figure 1 is an end elevation of a machine embodying the present invention.
Figure 2:
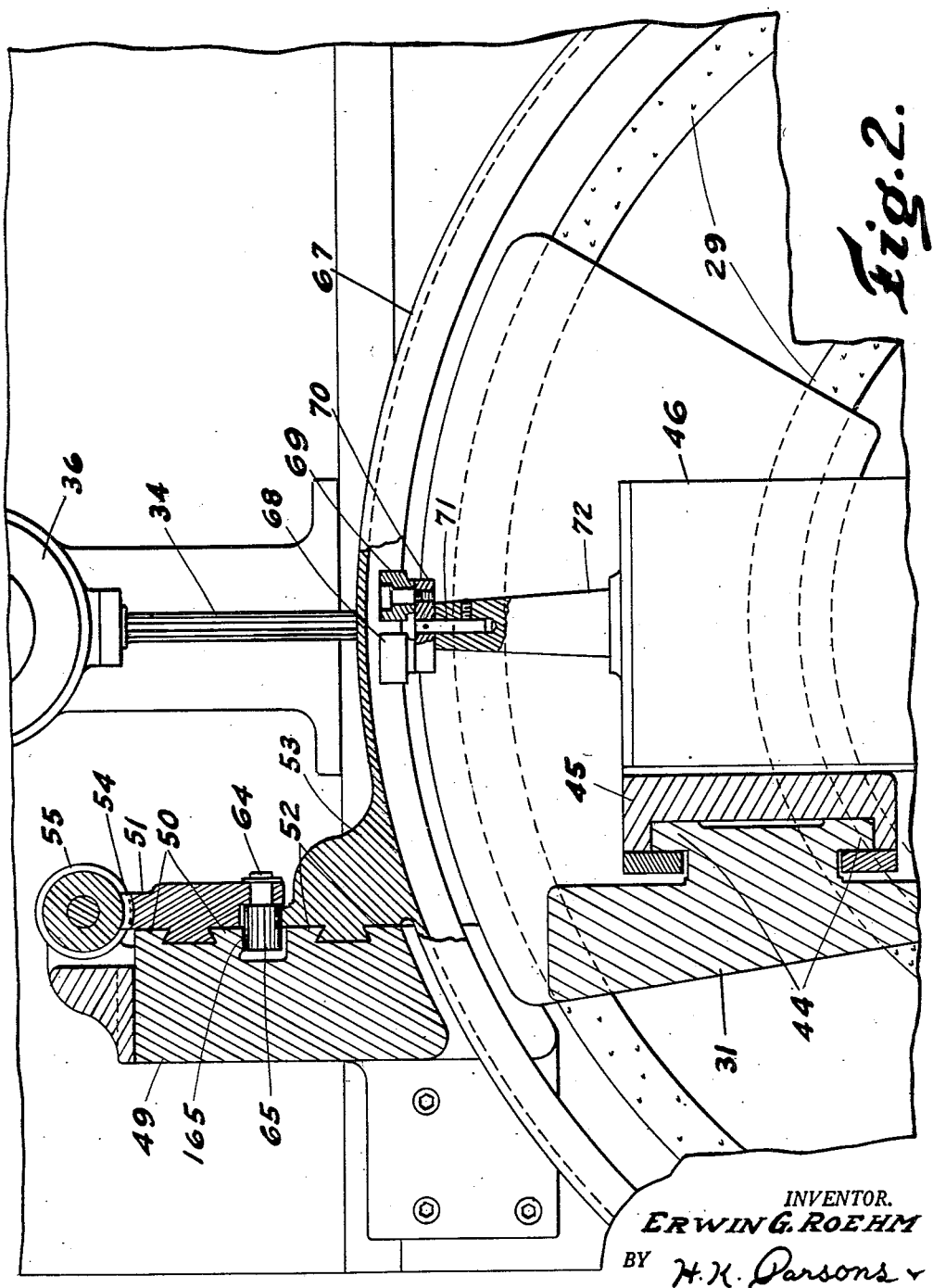
Figure 2 is an enlarged sectional view on the line 2—2 of Figure 1.

The present cutter spindle adjusting mechanism is adapted for use in conjunction with the type of machine shown in United States Letters Patent 2,674,160. Such a machine includes the bed 10 having a table or work supporting portion 11 at the forward side and at the rearward side a column 12 supporting the contour controlling pattern 13 and the adjustable brackets 15 and 16 for the angle determining patterns 17 and 18. Mounted on the bed for longitudinal movement as controlled by the motor 19 and rack and pinion 20 is the longitudinally movable carrier 21 supporting the transversely shiftable ram 22. Motor 23 and rack and pinion mechanism 24 regulate the transverse shifting movement of the ram. As is illustrated and described in detail in Letters Patent 2,674,160, the motors 19 and 23 are in control of a 360 degree tracer mechanism located at 25, which includes tracer finger 26 riding on the perpihery of the contour pattern 13. Carried on the forward portion of the ram is a vertical slide 27 adjustable by pilot wheel 28 and provided on its forward face with the arcuate ways 29 interlocking with the correspondingly formed ways 30 on the swivel bracket 31. Bracket 31 has secured thereon the arcuate rack 32 meshing with drive pinion 33 on spline shaft 34 driven through the bevel gears 35 by motor 36. Motor 36 is hydraulically coupled as indicated in Letters Patent 2,674,160 with the controlling tracer head 37 having the axially movable tracer finger 38 riding on the surface of pattern 18. Gear 39 meshing with the gearing 35 is connected by shaft 40 and gearing 41 to the vertical adjusting screw 42 for the bracket 43 which supports the tracer head 37. This gearing therefore provides a feedback mechanism operated in synchronism with the tilting of the swivel bracket 31 to adjust the bracket 43 to compensate for and limit the movement of the bracket to the amount dictated by pattern effected displacement of the tracer finger 38.

Formed on the one face of the swivel bracket 31 is a second set of arcuate guides 44 mounting for tilting or arcuate angular adjustment slide 45 on which is mounted the spindle carrier 46 provided with spindle 47 to receive cutter 48. By reference to the drawings and as particularly emphasized in Figure 3, it will be noted that both sets of arcuate guides have their centers of curvature located at the point O lying on the axis OL of the cutter spindle. As a result during any tilting movement of the spindle, either with the swivel bracket 31 around the ways 29 or with the spindle carrier slide 45 around the ways 44 will effect a bodily tilting of the spindle axis about the point O.

For controlling the tilting or arcuate adjustment of the slide 45, the vertical slide 27 is provided with an overarm 49 having a first set of arcuate ways 50 for the adjusting slide 51, and a second set of concentric arcuate ways 52 for the movement multiplying arcuate slide 53. These ways are again concentrically disposed with respect to an axis passing through the point O.

For effecting desired movement of the slide 51, it is formed with an arcuate rack at 54 meshing with worm 55 journaled on the overarm 49 and driven by shaft 56 and bevel gearing 57 connected to the drive motor 58. This second angle controlling motor 58 is connected by a mechanism shown in Letters Patent 2,674,160 with the tracer head 59 carried by bracket 60 which is slidably mounted on the ram and has the depending axially movable tracer finger 61 cooperating with the pattern 17. Vertical movements of the tracer finger 61 in its ambulatory path over the pattern 17, as dictated by the contour tracer finger 26, control the operation in one direction or another of the motor 58 and thus the clockwise or counterclockwise rotation of the worm 55. At the same time a gear and shaft transmission, indicated as an entirety by the reference character 62, provides a feedback transmission to the vertical adjusting screw 63 for movement of bracket 60 and thus tracer head 59 to compensate for or counteract pattern effected deflection or displacement of the tracer finger 61, in a conventional manner.

Carried by the slide 51 is an axle 64 bearing a pinion 65 meshing with rack 165 on the overarm 49, and at the same time meshing with rack 66 on the slide 53. As a result, actuation of the worm will move slide 54 and axle 64, causing pinion 65 to roll on rack 165, and through rack 66 to impart movement to the slide 53 in the same direction as the slide 54 but at an accelerated rate.

Secured to the underside of the slide 53 is the U-section arcuate guide track 67 cooperating with a follower comprising the rollers 68 and 69 on a block 70 swiveled on a pin 71 carried by a bracket 72 secured to the top of the spindle carrier 46, the pin 71 being in axial alignment with the cutter spindle 47. As particularly indicated in Figure 3, the arc of the guide 67 is described about point O as a center. Thus, during any tilting of the swivel plate 31, due to the interengagement of the guide rollers 68 and 69 with the arcuate rack the axis of the spindle will follow in a path which is central of the guide track, while any arcuate displacement of the slide 53 will react through the bracket 72 to cause a corresponding transverse tilting movement of the slide 45 about the guides 44. The results accomplishable in control of the final resultant position of the spindle axis in connection with compound tilting adjustments should be clear by reference to the diagrammatic view, Figure 3.

Figure 3:
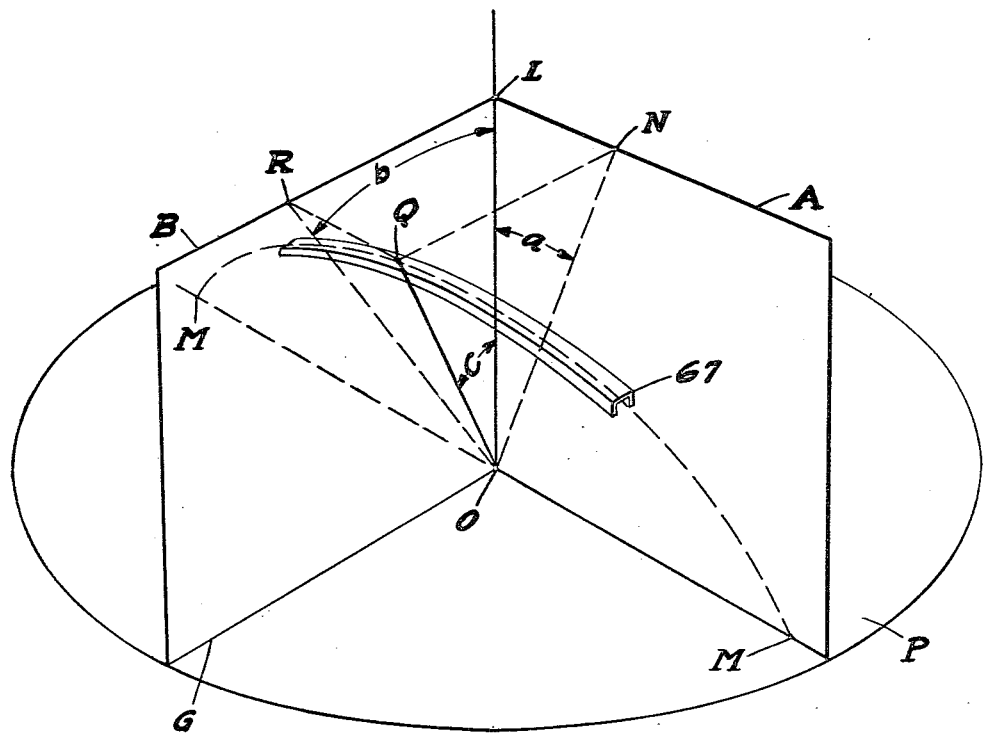
Figure 3 is a diagrammatic view illustrating the mathematical principles involved in the present improved manner of cutter spindle adjustment.

In machining to produce warped or air foil surfaces such as wing sections for aircraft, the cutter which is guided in a contouring path for proper surface angle generation must be additionally and simultaneously tilted in a resultant direction as schematically shown in Figure 3. The angle $c$ at which the axis of the cutter is tilted, is the resultant of the component angles $a$ and $b$ given in two fixed right angle coordinate vertical planes A and B, normal to horizontal plane P and identified as longitudinal and cross planes, intersecting along the vertical line OL. The center of the free end of the cutter is constantly at O on the cutter axis.

The point Q on the extended axis of the cutter assumes different positions on a spherical surface having its center in O, and radius OQ, including the position QL, depending on the values of component angles $a$ and $b$. The point Q, on the cutter axis engages the arcuate channel or guide track 67 of radius OQ, which has its axis of rotation at MM, in the horizontal plane P. The axis MM passes through the fixed point O on the cutter axis, and is normal to plane B. It is also the axis around which angular displacements $b$ take place. The axis OG, around which angular displacement $a$ takes place, is also in the plane P, passes through point O and is normal to MM and plane A. When setting for the angle $b$, arcuate guide 67 is bodily rotated around MM, thus displacing axis OQ in the direction parallel to cross plane B.

When setting for the angle $a$, axis OQ is bodily displaced in a tilted plane which lies at right angles to the plane of angle $b$, the point Q riding along the arcuate guide 67, to its proper position. Thus by coordination of the two component angular displacements by means of the arcuate guide 67, the axis OQ assumes the resultant tilt C with respect to the permanent intersection line OL of the planes A and B.

From the foregoing it will be noted that by employment of the present invention an extremely accurate positioning of the cutter spindle can be effected, the machine structure inherently making the necessary compensations for the desired resultant positionings without the necessity of careful mathematical calculations as to the necessary nature of the controlling pattern. It will further be noted that by the present construction the various motors, drive shafts and other drive and feedback connections for the angling sides are carried by the ram portion of the machine, minimizing both the amount of gearing and transmission elements required for power tarnsmission of motion to the tilting spindle carrier and to the swivel plate and at the same time permitting great simplification of the connections in the respective feedback transmissions.

In determining the correct axially tilted position of the cutter spindle for setting the cutter surface in proper tangential relation to generate a warped conical or airfoil surface, for example, the basic angular coordinates in two right angularly related planes, such as indicated in Figure 3, can be determined by projection measurement of a mock-up or model of the article to be produced. In the setting of the cutter one of these angles may be selected as the basic or primary angle to which a first adjustment of the cutter is made, but it will be understood that the proper resultant position cannot be effected by a direct tilt of the cutter axis and its spindle carrier in the opposite plane as the necessary resultant positioning of the cutter axis is a result of a projection of the two angles. For example, if a pronounced tilt is given to the swivel bracket 31 it is necessary that a decreased amount below the basically determined angle setting be made as respects the angular adjustment of the spindle carrier with respect to the tilted swivel bracket. However, by employment of the present invention in which the swivel bracket and the control slide members 51—53 are both supported in fixed position on the support, it is possible to set the swivel bracket directly to the desired angle in one plane and correspondingly to impart the pre-established amount of desired angular movement to the slide elements such as 51—53, for example, in the right angularly related plane for the slide as established by the overarm 49. The interconnecting means, such as the guideway or track 67 and follower, including rollers 68 and 69 and bracket 72, or equivalent motion transmitting means, then serve in the nature of an angle calculator or determinator effective to impart to the spindle axis OL the required resultant amount of angular adjustment of the spindle carrier on the ways 44 which will bring the properly effective portion of the cutter 48 into the correct desired tangent relationship with the work for generation of the predetermined surface on the work as determined by the patterns 17 and 18.

It will be understood that due to the combination of the arcuate shifting of the guide 67 about the center O which is also the center of generation of the arc of the guide, that for a definite positional setting angularly of the guide 67, there will be a variable tilting of the axis OL of the cutter and cutter spindle around the ways 44 depending on the amount of tilt imparted to the swivel bracket 31.

What is claimed is:

1. A machine of the character described including a support, a swivel bracket carried by the support for angular adjustment relative thereto, a spindle carrier mounted on the bracket for arcuate adjustment in a plane with the swivel bracket and for angular adjustment in a second plane relative to the swivel bracket, an overarm carried by the support in fixed relation thereto and in overlying relation to the swivel bracket, a slide on the overarm, and means connecting the slide and the spindle carrier as a pair of elements for effecting tilting movement of the spindle carrier on the swivel bracket in accordance with movements of the slide on the overarm.

2. A machine of the character described including a support, a swivel bracket carried by the support for angular adjustment relative thereto, a spindle carrier mounted on the bracket for arcuate adjustment in a plane with the swivel bracket and for angular adjustment in a second plane relative to the swivel bracket, an overarm carried by the support in fixed relation thereto and in overlying relation to the swivel bracket, a slide on the overarm, and means connecting the slide and the spindle carrier as a pair of elements for effecting tilting movement of the spindle carrier on the swivel bracket in accordance with movements of the slide on the overarm, said means including an arcuate guide carried by one of the two connected elements and a follower carried by the other of said elements and cooperating with said guide.

3. A machine of the character described including a support, a swivel bracket carried by the support for angular adjustment relative thereto, a spindle carrier mounted on the bracket for arcuate adjustment in a plane with the swivel bracket and for angular adjustment in a second plane relative to the swivel bracket, an overarm carried by the support in fixed relation thereto and in overlying relation to the swivel bracket, a slide on the overarm, means connecting the slide and the spindle carrier for movement of the spindle carrier on the swivel bracket in accordance with movements of the slide on the overarm, said means including an arcuate guide carried by one of the two connected elements and a follower carried by the other of said elements and cooperating with said guide, a first tracer mechanism operatively connected with the swivel bracket for determining angular adjustment of the swivel bracket and a second tracer mechanism operatively connected with the slide on the overarm for determining the adjustment of the slide with respect to the overarm.

4. A machine of the character described including a support, a swivel bracket carried by the support for angular adjustment relative thereto, a spindle carrier mounted on the bracket for arcuate adjustment in a plane with the swivel bracket and for angular adjustment in a second plane relative to the swivel bracket, an overarm carried by the support in overlying relation to the swivel bracket, a slide on the overarm, means connecting the slide and the spindle carrier as a pair of elements for effecting tilting movement of the spindle carrier on the swivel bracket in accordance with movements of the slide on the overarm, said means including an arcuate guide carried by one of the two connected elements establishing said second plane and a follower carried by the other of said elements and cooperating with said guide, a motor on the support, and a drive transmission connecting the motor and slide for actuation of the slide by the motor.

5. A machine of the character described including a support, a swivel bracket carried by the support for angular adjustment relative thereto, a spindle carrier mounted on the bracket for arcuate adjustment in a plane with the swivel bracket and for angular adjustment in a second plane relative to the swivel bracket, an overarm carried by the support in overlying relation to the swivel bracket, a motor on the support, a pair of concentric arcuate guides on the overarm, a slide mounted on each of said guides, drive connections between the motor and one of said slides, an arcuate rack on the overarm, a pinion carried by the driven slide and meshing with the rack, and a second rack on the other of said slides meshing with the pinion for accelerated actuation of said other slide with respect to the first slide when driven by the motor means on said other slide for establishing said second plane, and spindle carrier adjusting means connecting said plane establishing means with the spindle carrier.

6. A machine of the character described including a support, a swivel bracket carried by the support for angular adjustment relative thereto, a spindle carrier mounted on the bracket for arcuate adjustment in a plane with the swivel bracket and for angular adjustment in a second plane relative to the swivel bracket, and overarm carried by the support in overlying relation to the swivel bracket, a motor on the support, a pair of concentric arcuate guides on the overarm, a slide mounted on each of said guides, drive connections between the motor and one of said slides, an arcuate rack on the overarm, a pinion carried by the driven slide and meshing with the rack, and a second rack on the other of said slides meshing with the pinion for accelerated actuation of said other slide with respect to the first slide when driven by the motor, and spindle carrier adjusting means connecting said other slide with the spindle carrier, said means including a pair of elements, one formed with an arcuate guide establishing said second plane and the other with a follower engaging the guide, one of said elements being secured to said other slide and the other of said elements being secured to the spindle carrier.

7. A machine of the character described including a support, a primary angle swivel bracket, means supporting the bracket for tilting adjustment about a fixed axis with respect to the support, a spindle carrier mounted on the bracket for tilting adjustment therewith and for tilting relative thereto about an axis intersecting the bracket axis at right angles, a secondary angle controlling slide carried by the support, and motion transmitting means connecting the secondary angle controlling slide and the spindle carrier for effecting a resultant projected angle positioning of the spindle carrier on the bracket.

8. A machine of the character described including a support, a primary angle swivel bracket, means supporting the bracket for tilting adjustment about a fixed axis with respect to the support, a spindle carrier mounted on the bracket for tilting adjustment therewith and for tilting relative thereto about an axis intersecting the bracket axis at right angles, a secondary angle controlling slide carried by the support, and motion transmitting means connecting the secondary angle controlling slide and the spindle carrier for effecting a resultant projected angle positioning of the spindle carrier on the bracket, said connecting means including interengaged guide and follower members, one of said members being mounted on the slide and the other of said members being mounted on the carrier.

9. A machine of the character described including a support, a primary angle swivel bracket, means supporting the bracket for tilting adjustment about a fixed axis with respect to the support, a spindle carrier mounted on the bracket for tilting adjustment therewith and for tilting relative thereto about an axis intersecting the bracket axis at right angles, a secondary angle controlling slide carried by the support, and motion transmitting means connecting the secondary angle controlling slide and the spindle carrier for effecting a resultant projected angle positioning of the spindle carrier on the bracket, said connecting means including interengaged guide and follower members, one of said members being mounted on the slide and the other of said members being mounted on the carrier, said guide having the form of an arcuate track concentric with the axis about which the bracket tilts and extending in a transverse direction as respects said axis.

10. A machine of the character described including a support, a primary angle swivel bracket, means supporting the bracket for tilting adjustment about a fixed axis with respect to the support, a spindle carrier mounted on the bracket for tilting adjustment therewith and for tilting relative thereto about an axis intersecting the bracket axis at right angles, a secondary angle controlling slide carried by the support motion transmitting means connecting the secondary angle controlling slide and the spindle carrier for effecting a resultant projected angle positioning of the spindle carrier on the bracket, said connecting means including interengaged guide and follower members, one of said members being mounted on the slide and the other of said members being mounted on the carrier, said guide having the form of an arcuate track concentric with the axis about which the bracket tilts and extending in a transverse direction as respects said axis, and individual tracer controlled motors carried by the support and coupled respectively with the primary angle swivel bracket and with the secondary angle controlling slide for controlling the individual positionings of the respective slides.

References Cited in the file of this patent
UNITED STATES PATENTS

| | | |
|---|---|---|
| 2,424,031 | Heer | July 15, 1947 |
| 2,674,160 | Martellotti | Apr. 6, 1954 |
| 2,675,743 | Martellotti et al. | Apr. 20, 1954 |